United States Patent [19]

Yoshida et al.

[11] Patent Number: 4,932,016
[45] Date of Patent: Jun. 5, 1990

[54] APPARATUS AND METHOD OF RECORDING AND REPRODUCING DATA USING A DISK

[75] Inventors: Tadao Yoshida, Kanagawa; Kazuhiko Fujiie; Ryo Ando, both of Tokyo, all of Japan

[73] Assignee: Sony Corporation, Tokyo, Japan

[21] Appl. No.: 206,857

[22] PCT Filed: Oct. 12, 1987

[86] PCT No.: PCT/JP87/00764
§ 371 Date: Jun. 2, 1988
§ 102(e) Date: Jun. 2, 1988

[87] PCT Pub. No.: WO88/02917
PCT Pub. Date: Apr. 21, 1988

[30] Foreign Application Priority Data

Oct. 16, 1986 [JP] Japan ................ 61-246141

[51] Int. Cl.$^5$ ............ G11B 5/09; H04N 5/76
[52] U.S. Cl. ......................... 369/48; 369/59
[58] Field of Search .......... 369/32, 33, 44, 48, 369/59

[56] References Cited

U.S. PATENT DOCUMENTS 4,716,558 12/1987 Karayama et al. ............. 369/32
4,731,774 3/1988 Furukawa ........................ 369/59

FOREIGN PATENT DOCUMENTS 0029946 6/1981 European Pat. Off. .
0074841 3/1983 European Pat. Off. .
0164131 12/1985 European Pat. Off. .

Primary Examiner—Vincent P. Canney
Attorney, Agent, or Firm—Philip M. Shaw, Jr.

[57] ABSTRACT

Apparatus and method of recording and reproducing data using a disk to record musical performance data. Data related to the music and start times for each piece of music are recorded onto a table of contents section of the disk and the operation is controlled according to this data. Therefore, wasteful reproduction operation is avoided when there exists non-recorded areas between pieces of music or when a piece of music shorter than the initial piece of music is recorded overlapped thereon, enabling the music to be favorably reproduced. In carrying out the (sound) recording operation, furthermore, the non-recorded areas can quickly be found.

8 Claims, 8 Drawing Sheets

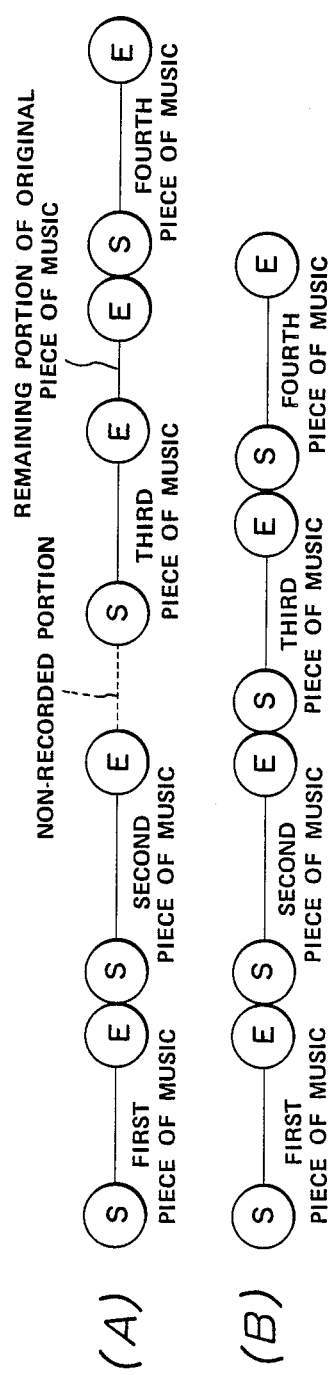

APPARATUS AND METHOD OF RECORDING AND REPRODUCING DATA USING A DISK

FIELD OF THE INVENTION

This invention relates to an apparatus and a method of recording and reproducing data using a disk on which information, such as musical performance information, can be recorded.

BACKGROUND OF THE INVENTION

There are so far been developed an optical disk on which audio signals, for example, are recorded in a digital form, or a so-called compact disk. On the compact disk, all the pieces of music are recorded and to end such that, in case of normal reproduction, the reproduction operation is continued after the end of the reproduction of a piece of music such that the next piece of music follows immediately thereafter.

Since the compact disk is dedicated to reproduction, it is desired that a disk system be evolved in which the disk is recordable and in a relation of superior compatibility with respect to the compact disk. However, in such disk system, all the musical pieces are not always recorded end to end such that an unrecorded portion may exist for example between the first and second pieces of music. If the continuous reproduction operation were performed in this case, the silent portion would be continuously reproduced from the end of the first piece of music until the start of the second piece of music. In case of a so-called overlapped recording, that is, when a new piece of music is recorded over a previously recorded portion, the original musical piece occasionally remaining after the end of the newly recorded musical piece would also be reproduced.

In addition, when performing a recording (sound-recording) operation, it is rather difficult to find the unrecorded portion and a lot of time may be involved in finding such portion.

In view of the above described problems, it is an object of the present invention to provide an apparatus and a method of recording and reproducing data using a disk wherein optimum reproduction can be performed without losses in the reproduction operation even when an unrecorded portion or portions exist between ajoining pieces of music, or when a piece of music shorter than the previously recorded piece of music is recorded overlapped thereon. It is another object of the present invention to provide a method and an apparatus for recording and reproducing data using a disk wherein an unrecorded portion of the disk can be found promptly in the course of the recording (sound recording) operation.

SUMMARY OF THE INVENTION

The apparatus for recording and reproducing data using a disk including a Table of Contents ("TOC") section in which the absolute time information is previously recorded and in which the first information indicating at least the numbers and the start time points of the respective musical pieces based on said absolute time information can be recorded, and a data region in which the second information such as the musical performance information can be recorded, includes, according to the present invention, means for reproducing said first information already recorded in said TOC section and transcribing the reproduced first information in a memory element in the apparatus upon attachment of said disk to the apparatus, means for writing said first information in said memory element at the time of recording said second information on said disk, and means for recording the information stored in said memory element into said TOC section of the disk after the end of recording and before taking out said disk.

The method for recording and reproducing data using a disk including a TOC region in which the absolute time information is previously recorded and in which the first information indicating the numbers and the start time points of the respective musical pieces based on said absolute information can be recorded and a data region in which the second information such as the musical performance information can be recorded, includes, according to the invention, reproducing said first information previously recorded on said TOC section at the time of disk attachment and transcribing the reproduced first information, writing said first information on said memory element at the time of recording said second information on said disk, and recording the information stored in the memory element in the TOC, section of the disk after the end of recording and before taking out said disk.

According to the present invention, the operation is controlled on the basis of the information indicating at least the numbers and start time points of the respective pieces of music. Thus the optimum reproduction may be achieved without wasteful reproducing operation even when there exist unrecorded portions between the adjoining pieces of music or when a piece of music shorter than the previously recorded piece of music is recorded overlapped thereon. In addition, the unrecorded portion can be located promptly in performing a recording (sound-recording) operation.

BRIEF DESCRIPTION OF THE DRAWINGS

FIG. 8 is a diagrammatic view illustrating of the effect.

DETAILED DESCRIPTION OF THE INVENTION

An embodiment of the present invention will be explained hereafter in detail by referring to the accompanying drawings.

Figure 2:
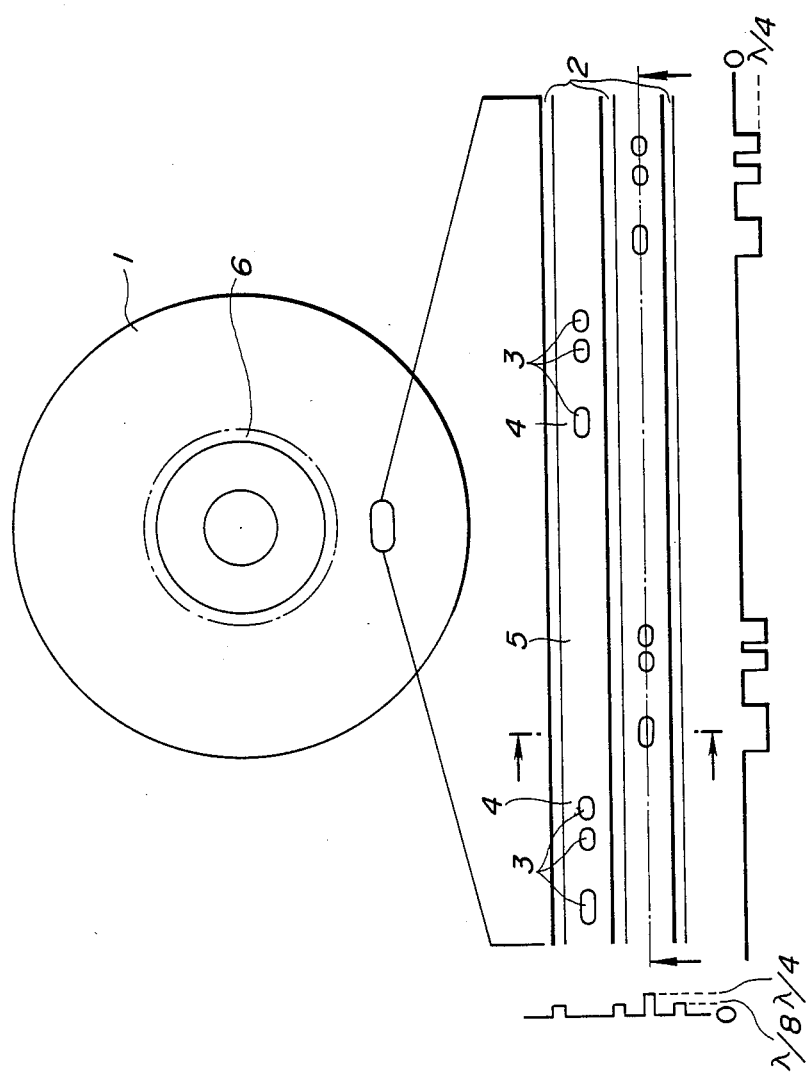
FIG. 2 is a diagrammatic view showing a disk in the above embodiment and also showing a portion of the performance area thereof on an enlarged scale.

A disk employed in the present embodiment will be explained first of all by referring to FIG. 2. in FIG. 2, the recording disk is an opto-magnetic disk, for example, having a diameter of 12 cm and provided with perpendicular magnetized film exhibiting a magneto-optical effect, and is driven into rotation at a constant linear velocity (CLV). On the recording disk 1, there are spirally formed pre-grooves 2 each λ/8 deep, λ being the wavelength of the laser beam. In the areas between the adjacent pre-grooves (or "lands") 2, emboss regions 4 consisting of patterns of indentations (or "pitts") 3 and data recording regions 5 in which optomagnetic recording is performed, are alternately formed at the respective equal pitches and along the circumferential direction of the disk. A pit 3 has a depth of λ/4.

Figure 3:
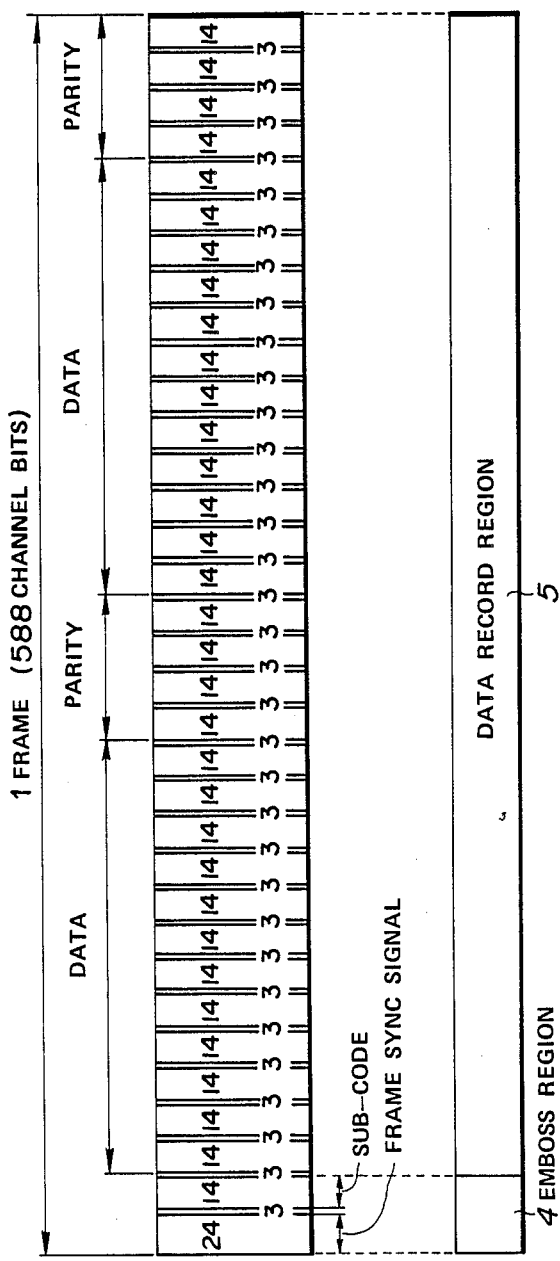
FIG. 3 is a diagrammatic view showing the construction of data recorded in the emboss region and in the data record region.

The construction of a frame defined by the compact disk format is shown in FIG. 3. Each frame is composed of 588 channel bits and formed by data modulated according to an eight-to-fourteen modulation ("EFM") format. Thus each frame is composed of a 24-bit frame sync signal, a 14-bit or 1-symbol sub-code and 32×14 bits, or 32 symbols, of data and parity codes, such as musical performance information. The respective symbols are connected by merging bits each consisting of 3 bits, so that the sum-total of the bits is 588.

Of the data constituting the aforementioned frame, the frame sync signals and the sub-codes are recorded previously in the form of patterns of indentations on the emboss region 4 while the data, such as musical performance information, and the parity codes are photomanetically recorded in the aforementioned data recording region 5. As described below, the sub-codes previously recorded in the emboss region 4 are only Q-channel data and, furthermore, only the absolute time information from the beginning to the end of the the musical performance information area.

In the lead-in area towards the center of the disk 1, there is provided a table of contents ("TOC") section 6 in which can be recorded information concerning the number of each musical piece, and the start time and end time thereof based on the aforementioned absolute time information. Opto-magnetic recording is normally used in this TOC section 6. Emboss regions 4 composed of the aforementioned patterns of indentations are also provided in the lead-in area apart from the TOC section 6 to make possible starting the rotating of the disk 1 the lead-in area by the CLV servo 11 which is adapted for rotationally driving a recording disk 1 at the constant linear velocity. The CLV servo 11 is described below FIG. 1.

Figure 4:
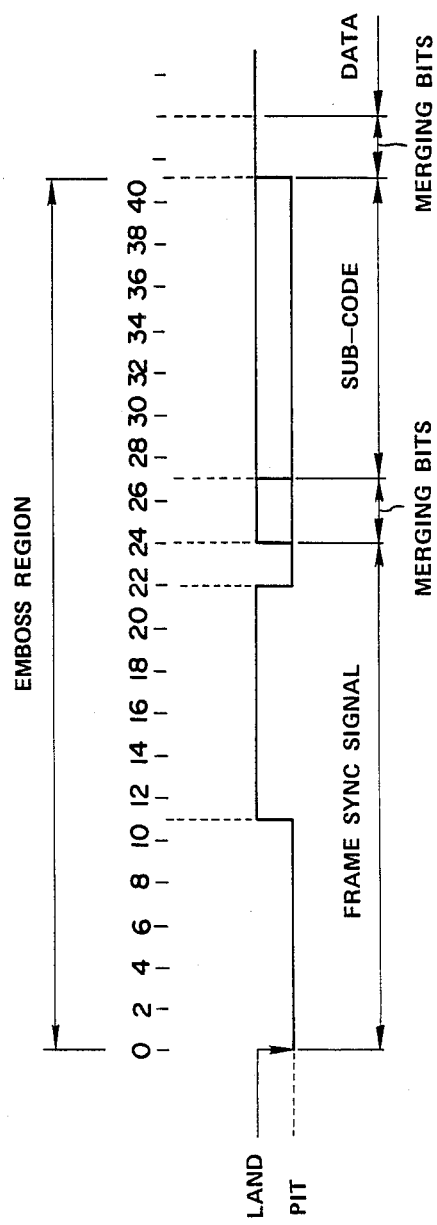
FIG. 4 is a diagrammatic view showing an example of construction of a pattern of indentations in the emboss region.

An example of the construction of the patterns of indentations 3 in the emboss region 4 will now be explained by referring to FIG. 4. It is the frame sync signal and the sub-code, including 3 merging bits and thus totaling 41 bits, that are recorded as the pattern of identations 3 in the emboss region 4. The 1st through 24th bits represent a frame sync signal which is made up of a pattern of indentations 3 of 11T-11T-2T according to the format for a compact disk, wherein T designates a period of channel clocks (4.32 MHz). The 25th through 27th bits and 28th through 41st bits represent merging bits and the sub-codes, respectively. The sub-code recorded herein is only Q-channel data and furthermore only the absolute time information from the beginning to the end of the musical performance information area. More particularly, it is the 14 bits that are recorded as the sub-codes, but it is only the Q-channel and, furthermore, only the absolute time information, that is desired to be recorded as the information. The absolute time information consists of minute (AMIN), second (ASEC) and frame (AFRAME) information.

The leading portion of the emboss region 4 is detected by an optical pickup 12, the detection output signal of which is used for phrase comparison within phase-lock loop circuit of the CLV servo 11 for rotationally driving the disk 1 at a constant linear velocity. The CLV servo 11 synchronizes on the detected leading portion so that high precision and reliability can be achieved. The leading portion is so important in this manner that the leading portion of the frame sync signal corresponding to the first bit of the emboss region 4 should be formed as a pit 3. Thus, while a pattern of indentations 3 opposite to the one shown herein may be envisaged according to the format of the compact disk, it is desirable to adopt a pattern beginning with a pit 3 if a pattern of 11T-11T-2T is employed.

The three merging bits following the sub-codes should be formed as lands so that if detection of the ends of frame sync signal or subcode pits 3 intruders into the land portions (merging bits), due for example to the response delay, the effect to such intrusion will be absorbed at the merging bits. This will prevent the situation where the data recording region 5 where the optomagnetic recording is performed, is affected by code-to-code interference. Also, since it is prescribed by the compact disk format that the pit portion and the land portion be 3T and 11T, respectively, it is necessary that the shortest duration of the pits 3 occasionally existing at the trailing end of the emboss region 4 be 3T. The merging bits between the frame sync signals and the sub-codes are determined according to the above mentioned 3T-11T rule.

Since only Q-channel data constitutes the aforementioned sub-code, it suffices in effect that patterns corresponding to Q=0, Q=1 be selected from among the 128 patterns. In this manner, a pattern with the maximum clock (bit clock) component can be selected. As an example, the emboss region 4 in its entirety can be formed with only the four patterns shown in FIGS. 5A through 5D. Thus the block sync signals S0. S1 of the sub-code are made up of the patterns of indentations 3 as shown at A and B in FIG. 5, respectively. The cases Q=0 and Q=1 are made up of the patterns of indentations 3 as shown at C and D in FIG. 5, respectively. For the cases Q=0 and Q=1. patterns including repetitions of 3T are used in order that the clock component will become maximum. It should be noted that for simplicity the same pattern for the frame sync signal is used in the above cases.

Figure 5:
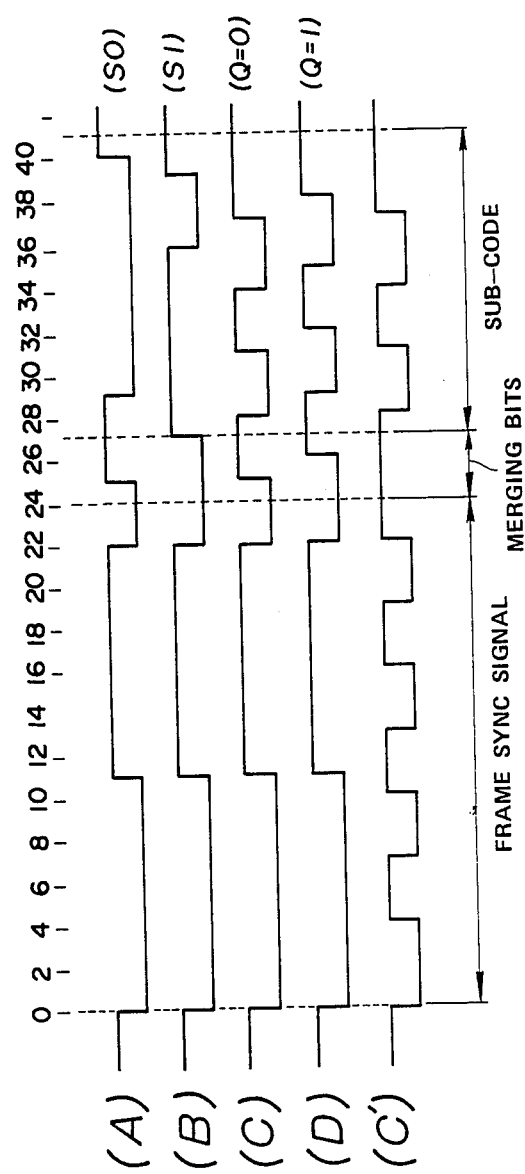
FIG. 5A–D and C' are a diagrammatic view showing a practical example of the construction of the pattern of indentations.

Moreover, when the frame sync signal is identified by the leading portion of the emboss region 4, the frame sync signal need not to be formed in accordance with the 11T-11T-2T pattern, but may be formed by the patterns including repetitions of 3T. Such a pattern for the case Q=0 shown at C in FIG. 5 is shown at C' in FIG. 5. In this manner, the clock component can be increased with increased quality of clock reproduction and increased facility in the construction of a phase-locked loop circuit adapted for bit demodulation. In such case, however, when the repetitive 3T patterns are detected, these need to be converted into the pattern of 11T-11T-2T before they are supplied to an EFM decoder. It should be noted that the pattern of the merging bits in FIG. 5C differs from that in FIG. 5C'.

Figure 1:
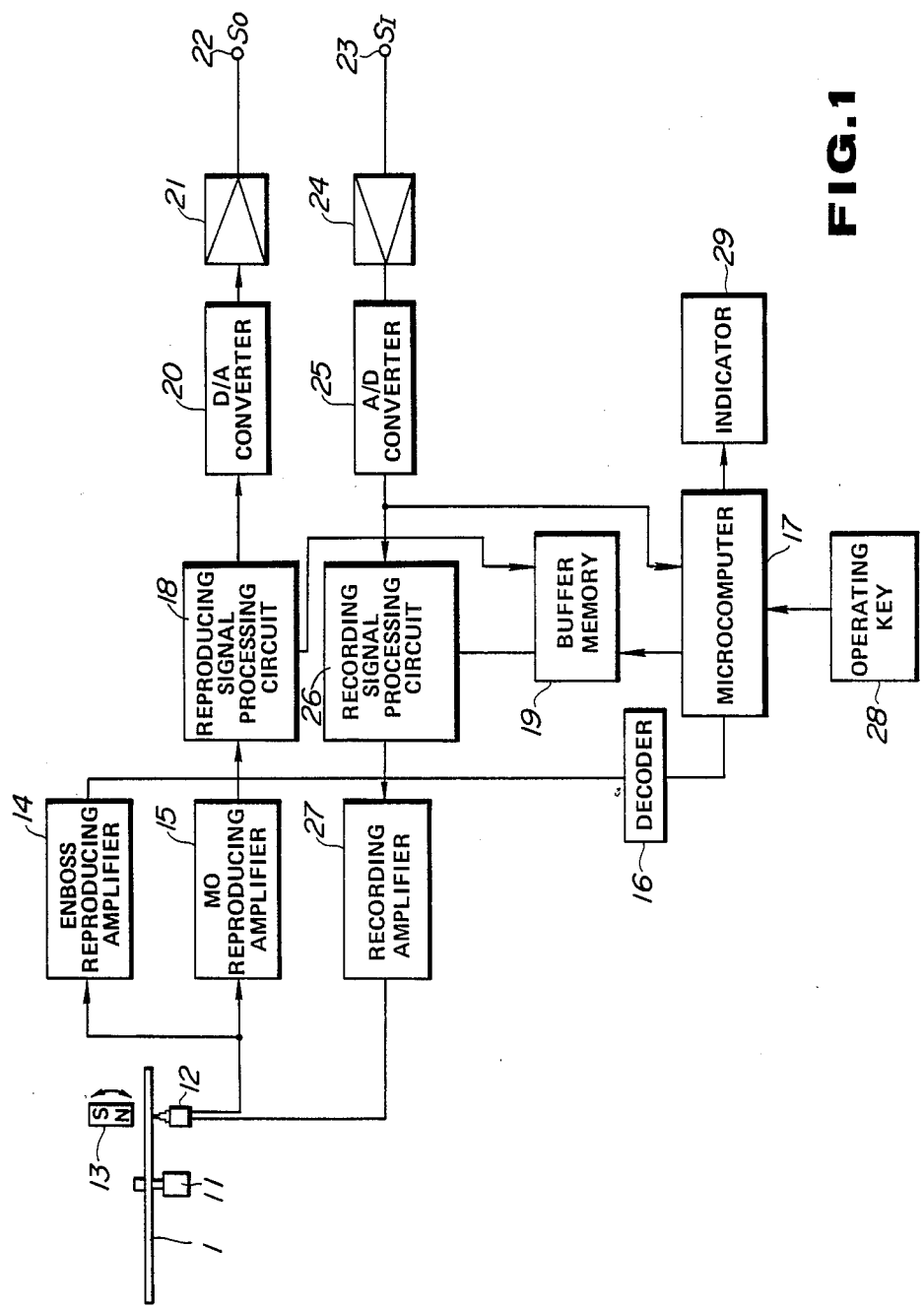
FIG. 1 is a circuit block diagram showing an embodiment of the apparatus for recording and reproducing data using a disk according to the present invention.

The construction of the disk recording/reproducing apparatus adapted for recording and/or reproducing audio signals using the above described recording disk 1 will be explained by referring to FIG. 1. In FIG. 1. the recording disk 1 is driven into rotation at a constant linear velocity by an electric servo motor 11. The optical head 12 is formed by optical components such as a laser diode, photo-detector, lens or a half mirror, and adapted for recording and/or reproducing the information upon irradiation of the recording disk 1 with a laser beam. On the opposite side of the recording disk 1 with respect to the optical head 12, there is provided a magnet 13 for applying an external magnetic field. The magnet 13 is controlled so that the orientations of the magnetic poles thereof are reversed for erasure from those for recording.

The signal portions of the RF signals (radio frequency signals) that are read from the optical head 12 and are associated with the emboss region 4, all supplied to an emboss reproducing amplifier 14. The signal portions associated with the aforementioned TOC section 6 and the data recording region 5 in which opto-magnetic recording is performed are supplied to a MO reproducing amplifier 15. The absolute time information or absolute address information from the emboss reproducing amplifier 14 is decoded in a decoder 16 before it is transmitted to a micro-computer 17. The output from the MO reproducing amplifier 15 is transmitted to a reproducing signal processing circuit 18 where it is processed in a predetermined manner. The information stored in the TOC section 6, that is, the information concerning the number of each piece of music and the start time and end time based on the absolute time information is transmitted from the processing circuit 18 to a buffer memory 19 used as the mempry element. The above information is transcribed in the buffer memory 19 at the time of attachment of the disk 1. The performance information recorded in the data recording region 5 is transmitted from the reproducing signal processing circuit 18 to a digital to analog ("D/A") converter 20 where it is converted into analog form to be outputted at a terminal 22 via a buffer amplifier 21 as the reproduced audio signal $S_0$.

For recording, audio signals $S_1$ to be recorded are supplied to a terminal 23. These signals $S_1$ are transmitted via a buffer amplifier 24 to an analog-to-digital ("A/D") converter 25 where they are converted into the corresponding digital signals. The performance information from the A/D converter 25 is transmitted to a recording signal processing circuit 26 where it is processed in a predetermined manner before it is transmitted via a recording amplifier 27 to the optical head 12 to be recorded in the data recording region 5 of the disk 1. During this recording, the output from the A/D converter 25 is also transmitted to a micro-computer 17 where the presence or absence of the recording signals, that is, the presence or absence of the silent portions between the musical pieces, is detected automatically. Based on the results of detection of the silent portions, the information concerning the numbers of the musical pieces and the start time and end time based on the aforementioned absolute time information is written in the buffer memory 19. Such information can also be written manually in the buffer memory 19 by an operating key 28. An indicator 29 is adapted for indicating the numbers of the musical pieces, the start time and the end time as well as indicating the length of the recordable unrecorded portion or portions on the disk 1, that is, the length of the residual recording time.

In the present embodiment, the information concerning the numbers of musical pieces stored in the buffer memory 19 is put into order by the microcomputer 17 immediately before the disk 1 is taken out of the apparatus, and the aforementioned information is transmitted from the buffer memory 19 through the recording signal processing circuit 26 and the recording amplifier 27 to the optical head 12 so as to be recorded in the TOC section 6 of the disk 1.

It should be noted that the absolute time information provided by the emboss region 4 of the disk 1 is also supplied to the microcomputer 17 during recording.

An example of the recording operation will be explained by referring to the flow chart of FIG. 6. On attachment of the disk 1, the information already recorded in the TOC section 6 of the disk 1 is transcribed to the buffer memory 19 at steps 101 and 102. The information concerning the number as well as the start time of the first piece of music is then written into the buffer memory 19 at step 103 and the recording operation is started at step 104. It is then detected whether or not the silent portion continuing for not less than 3 seconds exists at step 105. The step 105 is repeatedly performed until the silent portion continuing for not less than 3 seconds is found. On detection of the silent portion, the first absolute time information of the silent portion, that is, the start time of the silent portion plus one second, is adopted as the end time of the first piece of music, and this information is written in the buffer memory 19 at step 106. The last absolute time of the silent portion, that is, the end time of the silent portion less one second is adopted as the start time of the second piece of music and written into the buffer memory 19 along with the information concerning the number of second piece of music at step 107 and the recording of the second piece of music is performed. Then it is detected whether or not the silent portion continuing for not less than 3 seconds exists, at step 108 in the same way as at step 105. The operation similar to that performed for the first piece of music is performed for the second piece of music and those that follow. After the end of recording at step 109, the numbers of the musical pieces stored in the buffer memory 19 are into order at step 110. Putting into order the numbers of the musical pieces includes deleting the double indication of the numbers of the musical pieces in case the recording is newly made on the recorded disk and deleting the registration of any remnants of any preceding musical piece devoid of its leading or beginning portion. Also the numbers of the musical pieces are arranged in the order of the increasing absolute time information data associated with the recorded portions. After the numbers of the musical pieces are put into order, the information in the buffer memory 19 is recorded in the TOC section 6 of the disk 1 at step 111.

Figure 7:
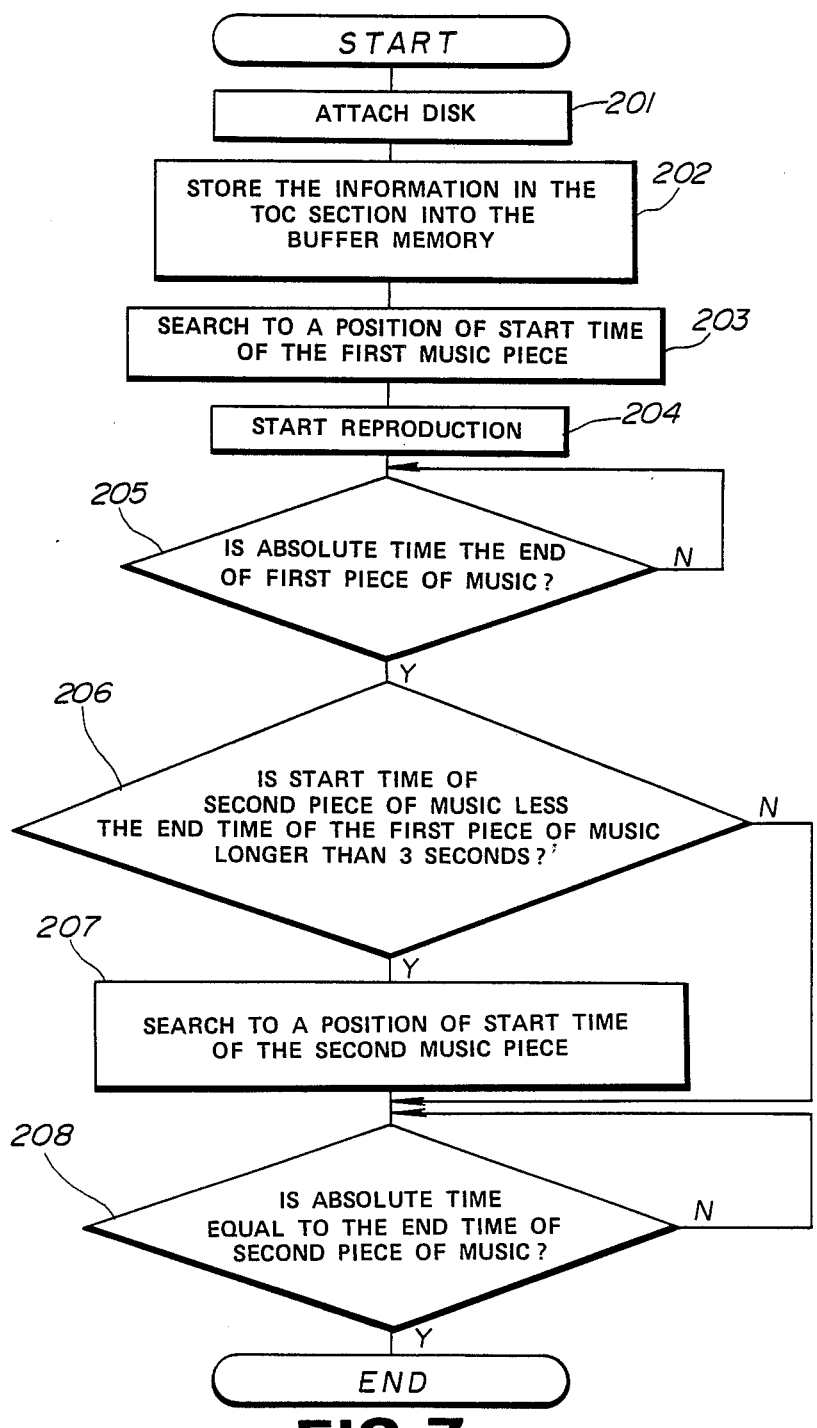
FIG. 7 is a flow chart ilustrating the usual reproducing operation.

An example of the reproduction operation is now explained by referring to the flow chart of FIG. 7. On attachment of the disk 1, the information already recorded in the TOC section 6 of the disk 1 is transcribed into the buffer memory 19 at steps 201 and 202. Then a search is made to the position of the start time for the first piece of music at step 203 and the reproduction operation is started at step 204. It is then detected whether the current absolute time information coincides with the information of the end time of the first musical piece at step 205. This step 205 is repeated until the coincidence is detected. Upon detection of such coincidence, it is determined whether the difference between the start time of the second musical piece and the end time of the first musical piece exceeds 3 seconds at step 206. In case such difference exceeds 3 seconds, a search of the disk 1 is made of the position of the start time for the second piece of music at step 207. In case the difference does not exceed 3 seconds, the second musical piece is reproduced without searching forward. It is then detected whether the current absolute time information coincides with the information of the end time of the second musical piece at step 208. The processing similar to that for the first musical piece is performed for the second musical piece and those that follow.

More precisely, the following results, for example, are achieved. It is now assumed that four pieces of music are recorded on the disk 1 in accordance with the pattern shown at A in FIG. 8. An unrecorded portion exists between the second and the third pieces, while a remnant of the prior recorded piece of music is left between the third and fourth pieces of music as a result of the overlapped recording of the third piece of music. In the figure, S and E denote the start time or start point and the end time or end point of the piece of music, respectively. Even when recording is made in this manner on the disk 1, it is possible with the above described recording/reproducing apparatus to reproduce the first through fourth musical pieces continuously as shown at B in FIG. 8, as though there were no remnant of a prior recorded piece of music remaining on the disk 1. This is normally made possible by searcing forward for the position of the next piece of music while jumping over any unrecorded area or remnants of prior recorded pieces of music.

Figure 6:
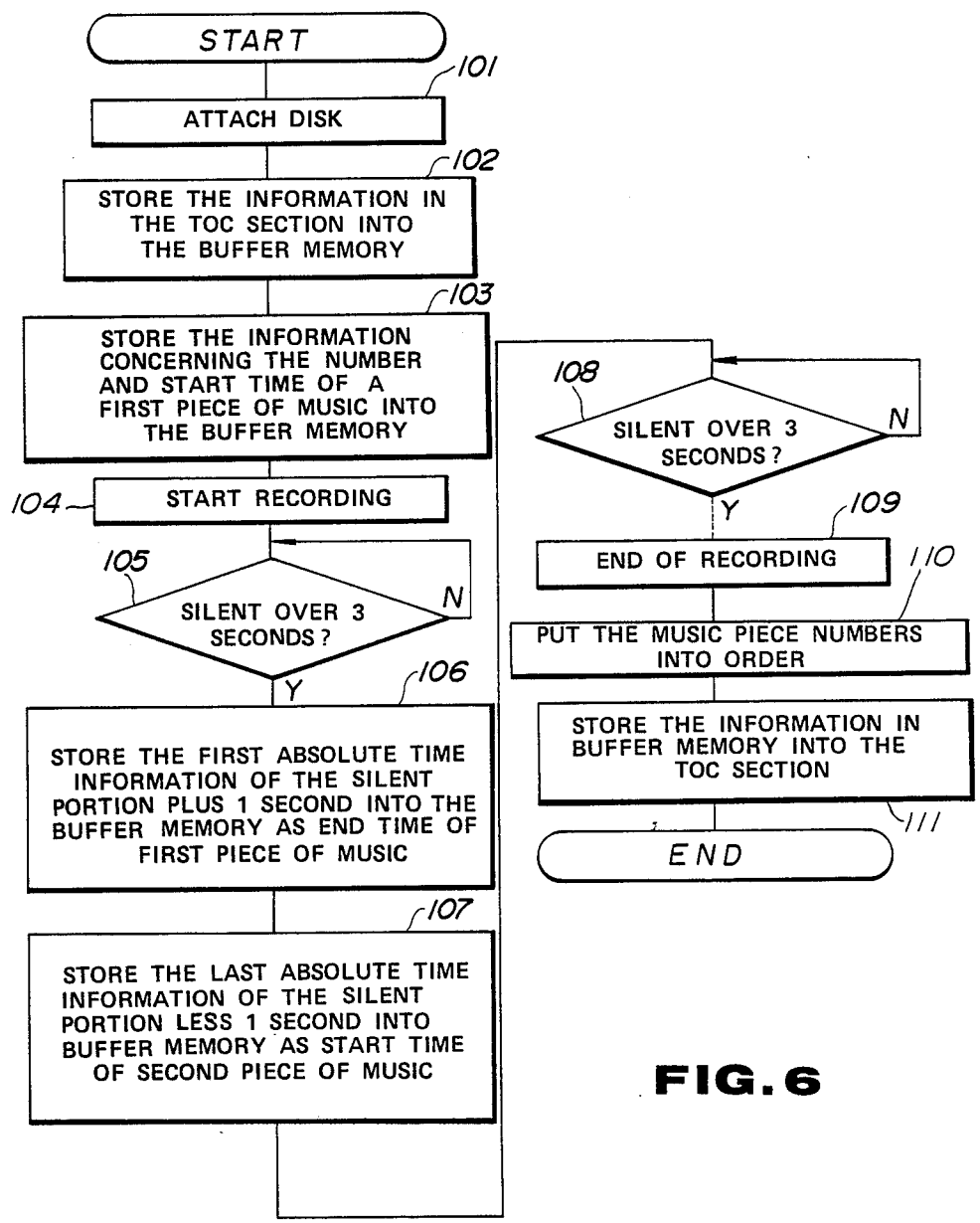
FIG. 6 is a flow chart illustrating an example of the operation during the usual recording operation.

Although not shown in the flow chart of FIG. 6, the length of the unrecorded and recordable portion on the disk 1 (the remaining time) is indicated on an indicator 29 and the high-speed searching is made to the beginning part of the unrecorded portion, before proceeding to the recording (sound recording), so that, the unrecorded portion can be located more promptly and efficiently. A more complicated control operation becomes necessary when there exists a plurality of unrecorded portions. For utmost simplicity, it suffices that the largest of the recorded end time information data be assumed to be the beginning of the unrecorded portion.

In the above described embodiment, the information concerning the start time and the end time for each piece of music is based on the absolute time information previously recorded on the emboss region 4 of the disk 1. However, as for the end time, the time information based on the time involved since the beginning until the end of the musical piece at the time of recording the information of the musical performance or the like may be adopted as such end time.

What is claimed is:

1. An apparatus for recording and reproducing data using a disk, said disk comprising a table of contents section in which absolute time information has been previously recorded on said disk and in which first information comprising start time information indicating the numbers and start times of second information may be recorded, said start times being based upon said absolute time information, said disk further comprising a data recording region in which said second information having active and silent portions, such as musical performance information, can be recorded, said apparatus comprising:

memory means for storing reproduced first information;

reproducing means for reproducing said first information already recorded in said table of contents section and transcribing said reproduced first information into a memory means in said apparatus upon attachment of said disk to said apparatus;

first writing means for writing said first information into said memory means when recording said second information on said disk; and recording means for recording said first information stored in said memory means in said table of contents section of the disk after termination of said recording and before taking out said disk.

2. The apparatus according to claim 1, wherein said first information further comprises end time information indicating the end times of said second information, said end times being based upon said absolute time information.

3. The apparatus according to claim 2, wherein said apparatus further comprises detecting means for detecting whether said silent portions of said second information have exceeded a first predetermined time period during said recording of said second information on said disk, said apparatus further comprising second writing means for writing said end time information into said memory means, said end time information being based upon the results of said detection by said detecting means.

4. The apparatus according to claim 3, wherein said end time information for each of said active portions of said second information comprises said start time of said silent portion following said active portion plus a second predetermined time interval added thereto.

5. A method for recording and reproducing data using a disk in a record/playback apparatus, said disk comprising a table of contents section in which absolute time information has been previously recorded on said disk and in which first information comprising start time information indicating the numbers and start times of second information may be recorded, said start times based upon said absolute time information, said disk further comprising a data recording region in which said second information having active and silent portions, such as musical performance information, can be recorded, said method comprising the steps of:

reproducing said first information previously recorded in said table of contents section at the time of attachment of said disk;

transcribing said reproduced first information;

storing said first information when recording said second information on said disk; and recording said stored information in said table of contents section of said disk after said recording of said second information and before taking said disk out of the record/playback apparatus.

6. The method according to claim 5, wherein said first information further comprises end time information indicating the end times of said second information, said end times being based upon said absolute time information.

7. The method according to claim 6, wherein said method further comprises the step of, when recording said second information on said disk, detecting whether said silent portions of said second information exceed a first predetermined time period and storing said end time information based upon the results of said detection.

8. The method according to claim 7, wherein said method further comprises the step of, when recording said second information on said disk, adding to said start times of said silent portions of said second information following said active portions thereof a second predetermined time interval to generate said end time information.

* * * * *